United States Patent [19]
Niinuma

[11] Patent Number: 5,378,867
[45] Date of Patent: Jan. 3, 1995

[54] REPAIRING METHOD WITH WELDING, WELDING METHOD AND WELDING APPARATUS FOR METAL MEMBER

[76] Inventor: Jun Niinuma, 4-27-3 Chiharadai, Ichihara-shi, Chiba 290, Japan

[21] Appl. No.: 29,240

[22] Filed: Mar. 10, 1993

[30] Foreign Application Priority Data

| | | | |
|---|---|---|---|
| Jan. 7, 1992 | [JP] | Japan | 4-045890 |
| Mar. 19, 1992 | [JP] | Japan | 4-063387 |
| Mar. 19, 1992 | [JP] | Japan | 4-063701 |

[51] Int. Cl.$^6$ ............................................. B23P 1/18
[52] U.S. Cl. ............................................. 219/76.13
[58] Field of Search ................... 219/76.13, 76.15, 77

[56] References Cited

U.S. PATENT DOCUMENTS

| | | | |
|---|---|---|---|
| 2,592,414 | 4/1952 | Gibson | 219/76.15 |
| 2,994,762 | 8/1961 | Todd | 219/76.15 |
| 4,405,851 | 9/1983 | Sheldon | 219/76.13 |
| 4,764,654 | 8/1988 | Ady | 219/76.13 |

FOREIGN PATENT DOCUMENTS

| | | |
|---|---|---|
| 4327378 | 11/1992 | Japan . |
| 694345 | 12/1979 | U.S.S.R. ............... 219/76.13 |

*Primary Examiner*—Clifford C. Shaw
*Attorney, Agent, or Firm*—Ronald P. Kananen

[57] ABSTRACT

For repairing a metal member by welding, a secondary electrode is connected to the metal member to be repaired. A thin sheet type welding material of about 0.1–0.2 mm thickness is provided on a part of the metal member or a fine welding powder of a proper volume is piled up on there. The welding material or the welding powder is pressed to the metal member along a minute line or dots by a primary electrode and an electrical conduction path is formed. A large pulse current of about 300–1500 amperes is applied through the conduction portion during a short period of about 1/1000–4/1000 seconds to form nuggets of a minute line or dots on the metal member. Thus, a build-up welding can be done along dots or a line. A part of the build-up welded portion is worn away and ground to obtain a desired surface or shape. A permanent magnet or an electromagnet may be mounted at the primary electrode when the welding powder is used.

8 Claims, 11 Drawing Sheets

FIG. 7(A)  FIG. 7(B)  FIG. 7(C)  FIG. 7(D)
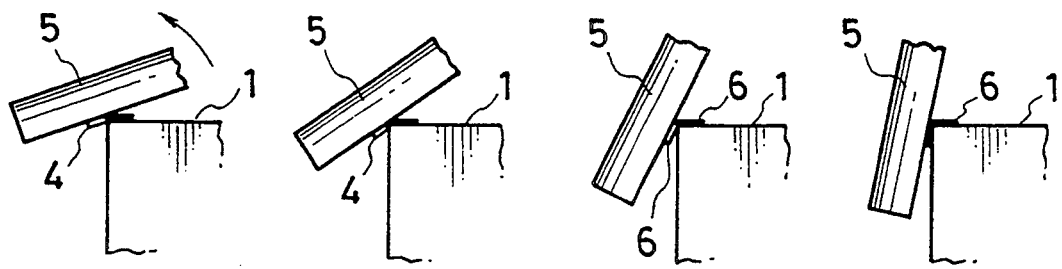
FIG. 8(A)    FIG. 8(B)    FIG. 8(C)
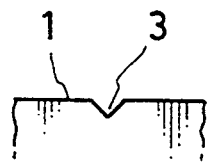 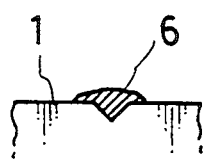 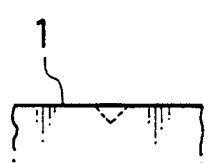
FIG. 9(A)  FIG. 9(B)  FIG. 9(C)  FIG. 9(D)
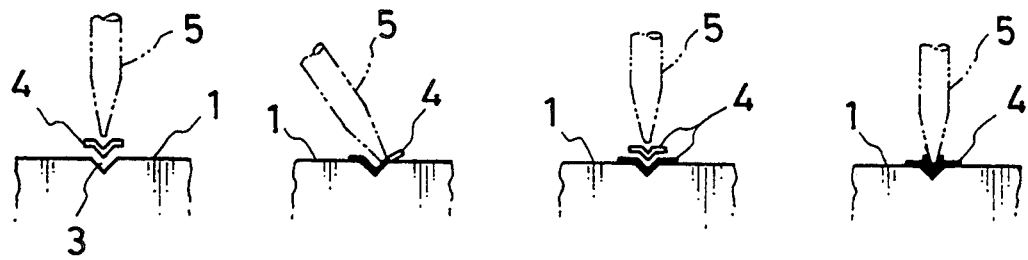

REPAIRING METHOD WITH WELDING, WELDING METHOD AND WELDING APPARATUS FOR METAL MEMBER

BACKGROUND OF THE INVENTION

This invention relates to a repairing method with welding, a welding method and a welding apparatus for a metal member. This invention can be applied to restore the shape or size of many kinds of metal equipment (hereinafter referred to as a metal member), such as metal molds for plastic jet molding or blow molding, metal molds for molding, metal molds for die casting, metal molds for glass molding or metal molds for press forming. In addition, this invention can be applied to repair or modify a relatively minute collapsing or flawed portion of, such a metal member.

In a general process to manufacture a new metal mold in a metal mold factory, the following problems commonly occur:

a) The metal member is over-scraped in a cutting process by a numerical control machine tool, such as a milling machine, with an input mistake, over-scraped by a manual machine tool through careless mistake, or over-scraped in a manual process with a file.

b) The metal member is damaged or bit by a secondary discharge (arc discharge) of an electric discharge machine.

c) A beaten mark, recession or flaw appear on the metal member from a hammer or a tool being dropped on the metal member or by hitting the metal member with a tool. These are caused by careless mistakes during a complex procedure or a lack of skill.

d) It is necessary to modify a thickness of a resin in a product evaluation by a test molding or by making the resin thicker in order to prevent flash from appearing.

e) An inner corner is curved in order to modify or change a design, or a height of the metal member is increased in order to change the scale thereof.

The following problems occur in a molding or casting factory using metal molds for plastic molding or rubber molding, metal molds for die casting or press metal molds:

f) The resin forms a parting line in the metal mold. Thus, the parting line may become hollow after the forming process is done several tens or hundreds of times.

g) A cavity, core, gnawn portion or the like may be gnawn or worn out during the forming process. The flaw may be made when a tool is carelessly used.

In other words, it is necessary frequently to repair, correct or modify the metal member in the factory as follows:

(1) It is necessary to repair the abrasion, obtuseness or collapse of the parting line of the metal mold.

(2) It is necessary to repair the abrasion, obtuseness or collapse of a corner of an edge portion and a triangular portion.

(3) A gnawn flaw of a sliding portion needs repair.

(4) A pin hole needs repair.

(5) It is necessary to repair an under-cut, flaw, blow hole or pit after an argon arc spot welding.

(6) A corner should be modified when it is redesigned to be curved.

(7) It is necessary to repair the gnawn flaw, an edge loss of a core pin or an ejector pin and to increase its height partially.

(8) It is necessary to repair the gnawn part of the metal molds for the rubber molding or the blow molding or a flaw in a driving pin.

(9) It is needed to repair a gnawn, a pushed cut or a butt portion.

(10) It is necessary to repair the loss of a raised core having a minute thickness.

(11) It is needed to repair a metal mold whose edge is a sharp knife shape.

The metal molds for the plastic molding or rubber molding, the metal molds for the die casting or the press metal molds are very useful in many kinds of industrial fields for mass production, high quality and uniformity of industrial products. Expensive machine tools and operators are needed to make the metal molds. Moreover, the metal mold should be manually ground by skilled workers. Thus, the metal mold is expensive and requires many days to make. For example, a cheap metal mold may be one million yen and a large metal mold or a precise metal mold may be fifty million yen. In the case of a manufacturing line of automobiles that needs products formed by the metal molds, the motorcars should be manufactured in accordance with a schedule and penalties may be imposed when the manufacturing line stops. If the metal mold cannot be used because of small flaw or crash, the manufacturing plan may be affected and an economical loss may occur. It becomes absolutely necessary to repair the metal mold.

In the prior art, the argon arc spot welding is generally used to repair the over-scraped in the manufacturing process of the metal mold, to change the design or to modify it. However, repair by argon arc spot welding has the following problems. First, since the arc temperature of the argon arc spot welding is high, such as 6000–8000 degrees C., the welded metal may shrink. Thus, a shrinkage problem may occur, i.e., a boundary between the heat affected portion and the welded metal or the bonded peripheral area becomes hollow. There are many kinds of "shrinkage" sizes. In general, the "shrinkage" is 1–4 mm in width and 1/100–5/100 mm in depth. Since the metal mold in the molten pool produces gas by itself and the argon gas and air are captured in the molten pool, a blow hole and pit may occur in the welded metal. In addition, the metal mold may be changed in shape and color by adding a heat to the metal mold. An under-cut frequently occurs.

Second, an argon torch takes up much space, so that it may be impossible to weld a small area and build-up welding may be very difficult at the inner corner. When the edge or flaw of the core pin is welded, the heat effect may bend the whole core pin and the peripheral area having no relation to the build-up welding may be bent or changed in color. Even if the color-changed product is ground, a pattern based on the metal organization change is added to the plastic product. The formed product looks bad and product value is reduced. The argon arc spot welding has many disadvantages, i.e., this welding is difficult if a worker is not skilled; a metal mold part, such as the core pin, and a fine ridgeline (rib), such as the parting line, melt by the high temperature; the heat effected portion and the relieving portion are brittle because of the high temperature; and the finishing is difficult because an excessive portion of the welding is large.

Repair by a silver brazing is relatively simple and has good bonding characteristics. However, the silver brazing cannot be used to deposit the metal mold material. The silver brazing material is soft, so that a flaw may occur by hitting. Moreover, it is not durable. When the whole metal mold should be heated by gas, the metal mold may change in shape and color. The total braze may melt when executing a second brazing.

A build-up plating is proper for repairing a large area. However, this build-up plating requires a long time and is often not realistic. The metal mold material cannot be plated. In addition, the deposition is weak, and it is easy to separate the plate. The plate liquid corrodes the metal mold and is dangerous for workers.

A beater mechanism is a conventional manner for repairing the parting line by beating the metal mold with a chisel. This manner is useful as a first step. However, the method cannot used again and is not proper for processing hard materials and hardening materials. The beater method limits the part to be processed and depends on personal skill. Since the part hit by the chisel becomes thin, it is not durable.

A repair method by inserting die is reliable and has the advantage that the material can be changed when strength is required. However, it takes a long time to repair. When a flaw occurs on a cavity (or the product surface), a boundary of the inset die material appears on the product surface. In such a case, this method may not be used.

It is therefore an object of the present invention to provide a repair method with a welding wherein the welding is strong and the repaired part is durable and is not easily separated. The durability according to this invention is equal to or better than a metal member.

Another object of the present invention is to provide a repair method with a welding and a welding method that does not affect a portion of a metal member adjacent to a welded portion by heat. There is no blow hole, pit, under-cut, shrinkage, color change or the like in the portion repaired by the welding. Since the welded portion is noncorrosive, it is safe for workers.

It is a further object of the present invention to provide a repair method with a welding and a welding method that can weld in a relatively short time, does not melt and lose a metal member, needs less unnecessary welding metal, is easy to finish and allows a manual finishing.

It is an additional object of the present invention to provide a repair method with a welding and a welding method that is simple in process, is easy to start, and does not require a skilled worker. This invention does not require know-how, such as a remaining heat process, which requires a skilled worker. This invention can repair a cavity (or a surface of a formed product) through welding without the repaired mark.

It is another object of the present invention to provide a primary electrode for a welding that can attach the welding powder of a necessary volume to the portion to be repaired with the welding and makes the welding process easy. This invention improves an efficiency of the welding process. The primary electrode of the invention includes a magnet.

SUMMARY OF THE INVENTION

According to a repair method for a metal member by welding through this invention, a secondary electrode is connected to the metal member to be repaired. A thin sheet type welding material having 0.1–0.2 mm thickness or a fine welding powder of a proper volume is provided on a part of the metal member to be repaired. A primary electrode presses the welding material or the welding powder, at a spot or along a line, to the metal member so as to electrically conduct to the metal member. A large current pulse of 300–1500 amperes flows through the minute conductive portion for 1/1000–4/1000 seconds to form a minute line of nuggets or spot nuggets on the metal member. By repeating the welding operation of pressing the primary electrode to the welding material and intermittently applying the current, the numerous nuggets are arranged in sequence or overlapped for the spot, line or plane type build-up welding at the necessary area of the part to be repaired. After that, the built-up welded part (padded part) is ground or polished to accomplish a desired plane or shape.

In a welding method proper to the repair method with the welding, a secondary electrode is connected to a metal member to be welded. A thin sheet type welding material having 0.1–0.2 mm thickness or fine welding powder of a proper volume is provided on a part of the metal member to be welded. A primary electrode presses the welding material or the welding powder, at a spot or along a line, to the metal member so as to electrically conduct to the metal member. A large current pulse of 300–1500 amperes flows through the minute conductive portion for 1/1000–4/1000 seconds to form the minute line of nuggets or spot nuggets on the metal member. In addition, the primary electrode is pressed to the welding material and a pulse current is applied intermittently. The primary electrode is moved slightly in the welding direction. The necessary welding material or the welding powder is supplied and the plural nuggets are arranged in sequence or overlapped for the spot, line or plane type build-up welding at the necessary area.

A welding apparatus, appropriate for the welding repair method and the welding method, comprises a secondary electrode electrically connected to a metal member to be welded, a thin sheet type welding material having 0.1–0.2 mm thickness or fine welding powder of a proper volume that is provided on the part of the metal member to be welded, a primary electrode is pressed to the welding material or welding powder, at a spot or along a line, to the metal member so as to electrically conduct to the metal member, and a power supply for providing a large current pulse of 300–1500 amperes between the secondary and primary electrodes during 1/1000–4/1000 seconds.

According to a welding method using a welding powder of the present invention, a secondary electrode is connected to the metal member to be welded. A fine welding powder of a proper volume is heaped up on a part of the metal member to be welded. One pole of a taper magnet approaches the welding powder on the metal member, in such a way that the welding powder stands up along a focused magnetic line of force from the magnet. The standing welding powder is pressed at a fine spot or along a line to the metal member by a primary electrode so as to electrically conduct to the metal member. A large current pulse of 300–1500 amperes flows through the conductive portion during a short time of 1/1000– 4/1000 seconds to form a minute line of nuggets or spot nuggets on the metal member. In addition, the primary electrode is pressed to the welding powder and the pulse current is applied intermittently. The primary electrode and the magnet are moved slightly in the welding direction. The necessary welding powder is supplied and the plural nuggets are arranged in sequence or overlapped for the spot, line or plane type build-up welding at the necessary area.

In the primary electrode appropriate for the repair method, the welding method or the welding apparatus using the welding powder according to the present invention, a permanent magnet or an electromagnet is provided at the portion to be welded with the welding powder. Non-magnetic material is used except where the primary electrode welds with the welding powder.

According to the welding theory of the present invention, the following may be conjectured. When the large pulse current flows instantaneously through the welding material or the welding powder provided as a minute line or spot on the metal member by the primary electrode, a fine spark is generated by the large current conduction shock of high density. Simultaneously, Joule heat is produced instantaneously to melt locally the welding material or the welding powder and only the fine conductive welding material or the welding powder of the metal of the metal member touching the primary electrode. Thus, the nugget (melt and solidified portion=small build-up welded portion) is strongly attached to the metal member by the coupling of atoms of the metal. In other words, when a resistance heat is generated at a location of the metal member and the welding material or the welding powder instantaneously and the temperature of the welding material or the welding powder reaches the melting point of the metal, a nugget is formed by the atom coupling as the full-fusion pressure welding with the discharge phenomenon. We cannot find another theory for the welding of different metals. A fine spot type nugget (having 0.2–1.0 mm diameter) is formed by the single short pulse of 1/1000–4/1000 seconds. The heat produced locally at this time is a very high temperature but it is instantaneous. Moreover, the heat capacity of whole mass of the metal member is almost infinitely large but the heat produced at the welding spot is small enough to be neglected. Thus, peripheral areas are not affected by the heat and the color of the metal member does not change.

A welded metal (nugget) of 0.6–1.0 mm diameter and 0.1–0.2 mm thickness is formed under the pressuring and melting spot of the primary electrode and numerous such small nuggets are arranged in sequence or overlapped. Thus, the build-up welding of a predetermined height is possible at a desired area. After the welding, the unnecessary portion of the padded part is cut and ground to repair the metal member to its original condition. The repaired metal is strong, durable and cannot be separated. A durable alloy similar to the metal member can be welded and the repaired condition may be perfect. All the heat can be absorbed by the metal member because of the minute line or spot type welding, and the heat does not affect the peripheral area of the welded portion. Thus, blow holes, pits, under-cuts and shrinkage do not appear at the welding repaired spot. Since chemicals are not used, the metal member does not corrode and change in color and it is safe for workers. The welded area is small, so that the welding can be accomplished in a short time. Unnecessary welded metal is limited and the welding is done locally, so that it is easy to grind and finish it. In addition, the manual finishing is easy. The welding preparation is simple and the welding operation can be started soon after the preparation. This invention does not need a skilled worker for the welding. It is unnecessary to be familiar with such know-how as the pre-heating of the metal member. Since this invention can repair a small flaw in an expensive metal mold necessary to a manufacturing process, the flaw resulting from many kinds of causes, and the repaired metal mold can be easily used, this invention is economical.

Assuming that the metal member is magnetic and the welding powder provided on the position to be welded is magnetic, when the magnet approaches them from the outside, the metal member and the welding powder are magnetized by a mutual magnetic introduction effect. The fine welding powder is attracted to the surface of the metal member and stands on the surface of the metal member along the magnetic line of force from the magnet. In the repairing of the obtuseness or the rib of a triangular corner, when the sharply tapered pole (N pole or S pole) of the magnet approaches the portion to be repaired, the welding powder stands along the corner or the rib and the welding powder does not run out. Thus, it is easy to keep the welding powder on the metal member by the primary electrode. The welding process is effective. The effective nuggets are formed and can be arranged in sequence or be overlapped.

In the welding method and the welding repair method of the invention using the welding powder, since the welding powder does not contain impurities, the welding power of the welded repair metal is strong. Moreover, it is durable and is not easily separated. It can weld an alloy having a durability equal to the metal member. The repaired condition of the metal member may be perfect. Welding powder without impurities can be used, so that the work efficiency is good, the welding preparation is easy and the welding process can be quickly started. The invention does not require skilled workers for the welding and anybody can weld easily.

In an application of the magnetic operation, assuming that the welding powder is directly attracted to the primary electrode and the permanent magnet or the electromagnet is provided at the portion to be welded, when the primary electrode approaches the magnetic welding powder, an appropriate volume of the welding powder is attracted to the primary electrode by the magnetic effect. When the primary electrode is moved to the portion of the metal member to be repaired by the welding, the metal member can be welded by the primary electrode. In this instance, it is not necessary to operate the magnet to follow the primary electrode.

When the electromagnet is used as the magnet of the primary electrode, the magnetic force can be controlled electrically and the volume of the welding powder attracted can be adjusted. All the welding powder can be exfoliated from the primary electrode by turning off the power to the magnet.

In the primary electrode with the magnet, if the portions thereof, other than the portion attracting the welding powder for the welding, consist of a non-magnetic material, the welding powder of necessary volume is attached only to the portion to be welded and is not attached to the other portions. Thus, the welding process is speedy and reliable.

When using the primary electrode with the magnet, the welding is done by adhering the welding powder of necessary volume directly to the primary electrode or the part of the metal member to be welded for the repair. Thus, the efficiency of the welding process efficiency is improved. The flaw in the expensive metal member can be repaired.

The scope of the present invention will be understood by reference to the following detailed description. However, the following description will be made only on preferred embodiments and it is apparent for those skilled in the art that various modifications and changes can be made without departing from the scope and spirit of the present invention.

BRIEF DESCRIPTION OF DRAWINGS

This invention may best be understood by reference to the following description and the drawings of the embodiments. However, these drawings are used as terms of description and not of limitation.

FIGS. 7A through 7D are plane views showing the processes of welding the rib of the metal member with the thin sheet type welding material;

FIGS. 8A through 8C are front views showing a method of the welding repair for a pin hole occurring in the metal member;

FIGS. 9A through 9D are front views showing a method of welding the pin hole or a V-notched flaw of the metal member by using the thin sheet type welding material;

EMBODIMENTS

Figure 1A:
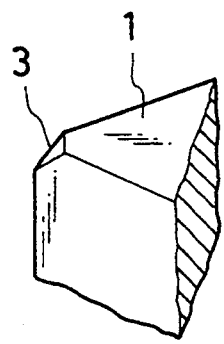
FIGS. 1A through 1C are perspective views showing processes for repairing an obtuseness of a corner of a metal member with welding.
Figure 1B:
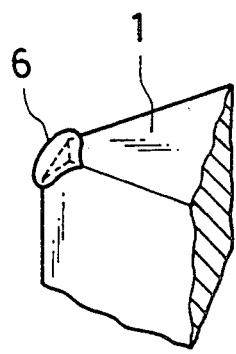
Figure 1C:
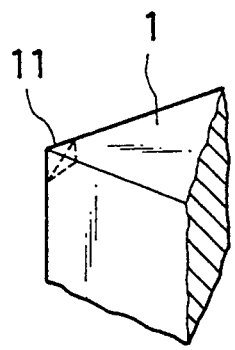

Referring to FIGS. 1A through 1C, FIG. 1A illustrates a triangle apex corner 3 of a metal member 1, to be repaired damaged due to abrasion, obtuseness or collapse. FIG. 1B shows a condition where a build-up welding 6 is performed in sufficient mass at the part to be repaired. FIG. 1C shows a condition where an excessively padded metal (excessive part of the build-up welding) is worn away by a tool, such as a grinder or a scraper and is ground by the grinder or a file to recover the corner 11 of the triangle apex.

Figure 2:
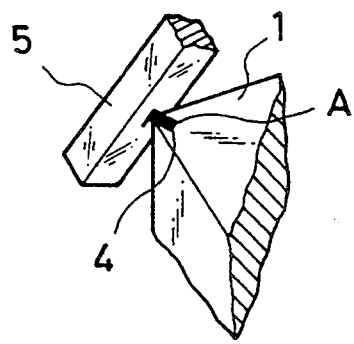
FIG. 2 is a perspective view of a method of welding the obtuseness of the metal member corner using a thin sheet type welding material.
Figure 3A:
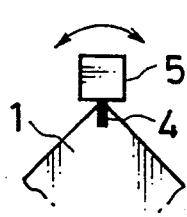
FIGS. 3A through 3D are plane views showing the processes of welding the obtuseness of the metal member corner with the thin sheet type welding material.
Figure 3B:
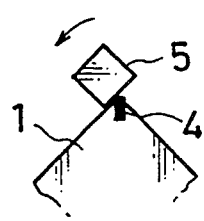
Figure 3C:
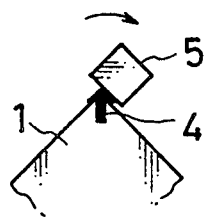
Figure 3D:
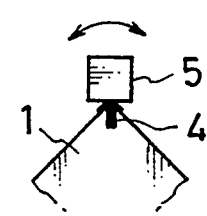

FIG. 2 is a perspective view for showing the build-up welding method at the corner of the triangle apex. FIGS. 3A through 3D illustrate how to use a primary electrode 5 of the build-up welding method. A square bar (or a flat plane) as shown in FIG. 2 is appropriate for the primary electrode 5 in the build-up welding for the corner of the triangle apex. A welding material 4 is a thin sheet having a thickness of 0.2 mm and a width of 5 mm. This welding material 4 is provided on the part to be repaired at a 45-degree angle to it. The primary electrode 5 touches the welding material 4 along a minute line. First, the primary electrode 5 temporarily welds (track welding) a spot part A for the positioning. Second, the primary electrode 5 is moved upward, downward, in the left direction and the right direction as shown in FIGS. 3A through 3D where a pressure applied to the welding material 4 may be applied by a worker. The minute line or spot type welding operation is repeated for the build-up welding by arranging plural nuggets in sequence and overlapping the nuggets. If the thickness of the padded part (the buildup welded part) is not sufficient, the welding material 4 is bent or further welding material is applied and the primary electrode 5 presses the welding material to overlap the nuggets.

Figure 4A:
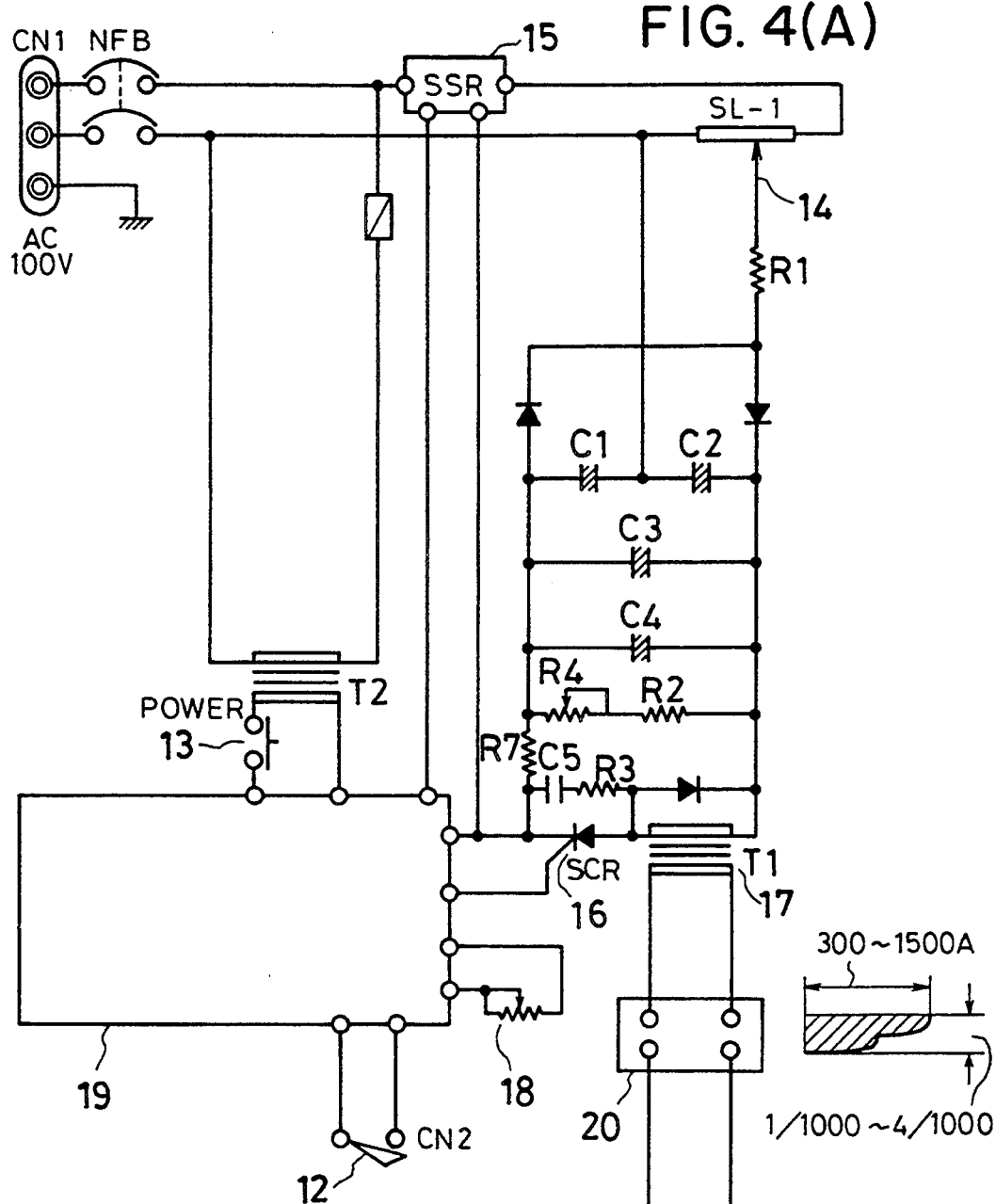
FIGS. 4A and 4B are circuit diagrams of a power supply.
Figure 4B:
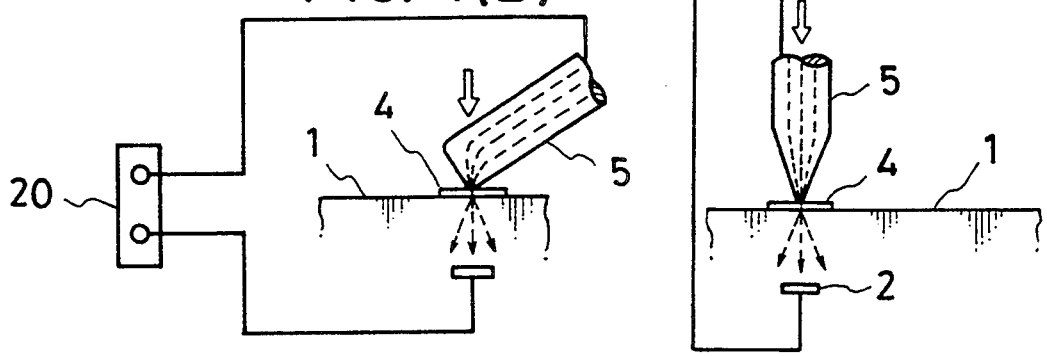

FIGS. 4A and 4B illustrate a power supply apparatus used in the build-up welding. In the lower right part of FIG. 4A, a tapered cone-shaped primary electrode 5 is shown where the end of the primary electrode 5 is a small circle having a semidiameter of 0.2–0.5 mm in order to increase a current density at the end of the primary electrode 5, to press the thin sheet type welding material 4 to the metal member 1 along a minute line or at a small spot and to make a limited current path. The primary electrode may be, for example, an alloy of silver and tungsten (or brass) of a round bar (square bar) having a diameter of about 3 mm or 5 mm and a length of about 50 mm. Although copper has a characteristic of adhering to and melting with the metal member, copper is not appropriate for the primary electrode.

Figure 5:
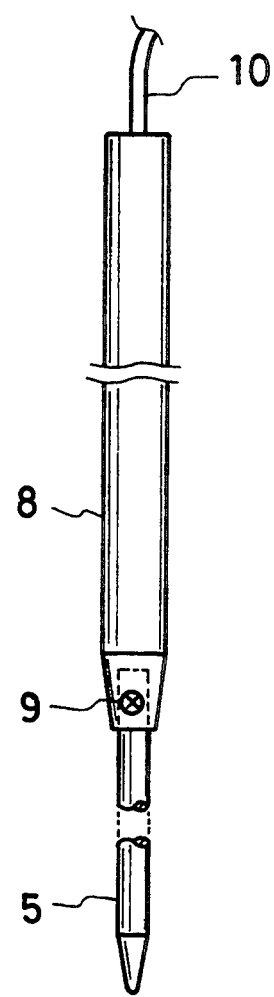
FIG. 5 is a front view of a primary electrode.

Since the primary electrode may become the alloy of the nugget, a material not appropriate for the alloy cannot be used. FIG. 5 shows a manual type primary electrode 5 wherein the electrode is inserted to an end of an electrode holder 8 of insulating material, such as hard rubber, and is fixed by a set screw 9. The end of the primary electrode 5 may be ground by a grinder or file before usage or during usage in order to form the appropriate shape. The primary electrode 5 is connected to the primary side of the power supply apparatus through a code 10 and electrode holder 8.

A secondary electrode 2 is connected to a secondary side of the power supply apparatus. This secondary electrode is connected electrically to the metal member 1 by being attached to the metal member 1 or connected to the lower surface of the metal member 1.

The material chosen for the thin sheet type welding material 4 depends on the material of the metal member 1. If the metal member is steel, the welding material may be an alloy of iron and nickel, as this alloy has good welding characteristics. If the metal member is steel or stainless steel, a welding material of stainless steel is proper. These welding materials are commercially and cheaply available. The welding material 4 is prepared by a rolling mill. The welding material may be 0.1–0.2 mm in thickness and about 5 mm in width. In special usage, it may be about 30 mm in width and 100 mm in length. If the welding material is thin, it can be effectively welded even if the current is low. For example, the welding material of 0.1 mm in thickness can be used for the welding process when the current value is about 300 amperes. However, about 0.2 mm thickness may be proper to obtain nuggets having enough thickness, in consideration of the current value and the welding characteristic. Copper and aluminum cannot be used for the welding even if the metal member 1 is conductive. Beryllium, copper alloy, aluminum alloy, steel and stainless steel may be better for a main material. Hard metal can be welded to the steel having a nitride processed surface and the hard metal. The part of the metal member 1 to be welded should be pre-processed by previously removing rust, oil and impurities.

In the power supply apparatus in FIG. 4A, an AC line of 100 volts is used as a source. When a power switch 13 is turned on, welding is possible. When an welding operator turns on a foot switch 12 once, one conduction (one pulse) welding is done. A welding voltage is adjusted by a voltage adjuster 14 within a range between AC 0 volt and 10 volts. When the foot switch 12 is turned on once, a solid state relay 15 charges capacitors C1, C2, C3 and C4. After that, a thyrister (SCR) 16 starts the discharge operation. Then, a large current (300–1500 amperes) flows through a secondary section of a transformer 17 at a low voltage and it further flows from the primary electrode 5 to the secondary electrode 2 immediately for the welding. A pulse current waveform flowing immediately through the primary electrode 5 is shown in FIG. 4A wherein the conduction period (1/1000–4/1000 seconds) and the current value (300–1500 amperes) are inversely proportional. When the foot switch 12 is on continuously, the charge and discharge operations are done intermittently to execute continuous welding. The intermittent period may be adjusted by a timer 18 within a range of 0.3–1.5 seconds. A reference number 19 of FIG. 4A represents a control and display section of the power supply apparatus. This power supply apparatus is compact and light. When repairing manually the metal member 1 with the welding, the primary electrode 5 is mounted to the electrode holder 8 as shown in FIG. 5 and the code 10 is connected to the power supply apparatus via a socket 20. The thin sheet type welding material 4 is provided on the part of the metal member 1 to be repaired. The worker holds the electrode holder 8 and presses the end of the primary electrode 5 to the welding material 4 strongly. Then, the foot switch 12 of the power supply apparatus is turned on and the large current pulse of 300–1000 amperes is applied to form the spot type nugget on the metal member 1. The primary electrode 5 is moved forward by a pitch corresponding to the diameter of the nugget to arrange the nuggets in series or overlap the nuggets. Then, the spot, line or plane type build-up welding, with enough thickness, is accomplished in an area or a length necessary to repair the part of the metal member. When the welding is done by a machine, the primary electrode 5 is mounted to a robot hand or the like and an automatic switch is provided at the power supply apparatus. In FIG. 4B, the round bar having a flat end is used as the primary electrode 5, and the edge corner thereof presses the welding material 4 to the metal member along the minute line or at the spot for the welding. The end of the primary electrode 5 is rounded with a semidiameter of about 0.2–0.5 mm.

Figure 6:
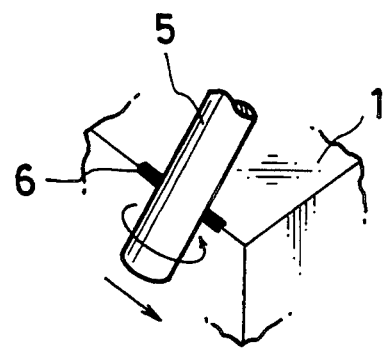
FIG. 6 is a perspective view showing a method of welding a rib of the metal member with the thin sheet type welding material.

FIG. 6 shows the welding method of repairing the rib (ridge-line) of the metal member 1. The thin sheet type welding material is attached to the metal member 1 along the rib to be repaired and the round bar of the primary electrode 5 is rolled for the welding. FIGS. 7A through 7D illustrate the movement and the angle of the primary electrode 5 viewed from the side. About half of the thin sheet type welding material 4 is welded to one surface (an upper surface in the drawings) of the rib line and then the other half of the welding material 4 is welded to the other surface (left surface of the drawings) by moving the primary electrode 5 as shown in FIGS. 7A through 7D. Thus, the build-up welding process is completed along the rib. The excessive part of the build-up welded portion 6 is worn away, ground and finished to recover the rib of the metal member 1.

FIG. 8A illustrates the repaired portion 3, such as a small V-notched flaw or a pin hole, occurring on the metal member, FIG. 8B illustrates the build-up welding process 6 executed on the part to be repaired, and FIG. 8C shows the recovered condition by wearing away the excessively padded metal portion.

FIGS. 9A through 9D illustrate in detail the build-up welding process for a small pin hole less than 1 mm diameter or a V-notched flaw. In FIG. 9A, the welding material 4 is bent similarly to the V shape of the V-shaped part 3 to be repaired and the bent welding material is positioned at the part 3 to be repaired. The primary electrode 5 presses the welding material and welds it. In FIGS. 9B through 9D, the welding operation is continued from one side of the V-notched flaw to the other side thereof by using the welding material. The welding materials are overlapped to obtain the thickness of the build-up welding material necessary for the repair of the V-notched flaw. The mass of nuggets 6 is struck with a hammer to thicken the metal texture. Then, the excessive part is worn away, ground and finished similarly to the above discussed embodiment. A mirror surface repair is possible.

Figure 10A:
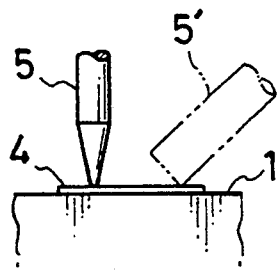
FIGS. 10A through 10C are front views showing the processes of a multi-layer build welding by using the thin sheet type welding material.
Figure 10B:
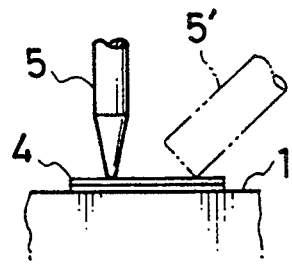
Figure 10C:
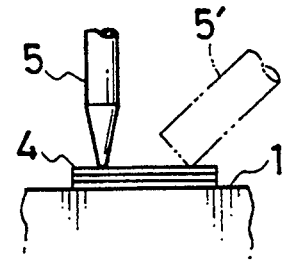

FIGS. 10A through 10C illustrate the welding repair method with multi-layered plates, wherein the real line shows a small round electrode 5 standing vertically and the tow-dot line shows a round bar electrode 5' that is rolled. In the welding by the vertical standing small round electrode 5, the end of the electrode 5 is repeatedly moved forward by a small pitch for the welding of the continuous nuggets. In the welding with the inclined electrode 5', the electrode is rolled to continue the welding. After completing the welding of the first layer of the welding material 4, the second and third layers of the welding material 4 are overlapped and welded such that the nuggets are overlapped. Every time the welding material 4 is welded, the irregular surface thereof is processed flat by a file and then the next layer of the welding material 4 is overlapped. It is preferable that the first layer is welded by the small round electrode 5 standing vertically and the second and other later layers are welded by rolling the round bar electrode 5'.

Figure 11A:
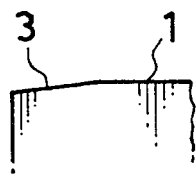
FIGS. 11A through 11C are front views showing processes of a build-up repair on the surface of the metal member.
Figure 11B:
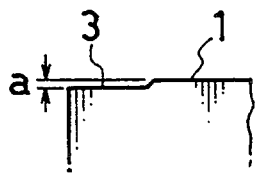
Figure 11C:
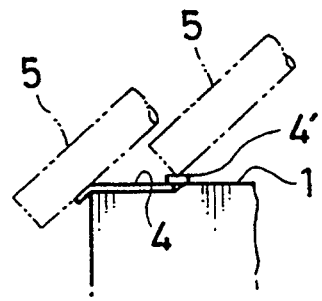

FIGS. 11A through 11C show how to repair by welding a part of the flat surface that is over cut or ground as shown in FIG. 11A, In order to repair the part 3 to be repaired, this part is ground by about 0.1 mm (FIG. 11B), the welding material 4 is padded thereto and the part is welded by moving the primary electrode 5 (FIG. 11C). Another welding material 4' is attached to the boundary to from the build-up portion. Then, the excessive part is worn away, ground and finished to complete recovery.

Figure 12:
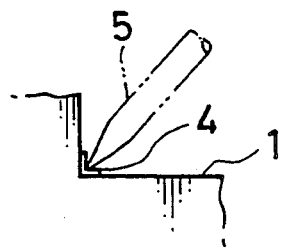
FIG. 12 is a front view showing a welding repair method for an inner corner of the metal member.

FIG. 12 shows a method of repairing the inner corner of the metal member 1 by the welding with the radius process. The welding material 4 is previously bent to form a predetermined angle and it is attached to the inner corner. The end of the primary electrode 5 is sharp and is pressed to the welding material 4 strongly for the welding. A thin round line type welding material having a diameter of 0.2-0.5 mm is used for repair with the welding.

Figure 13:
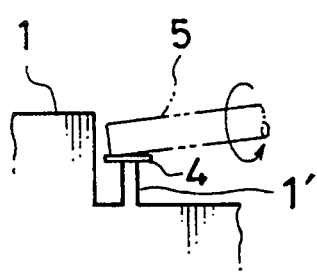
FIG. 13 is a front view showing a method of a welding repair for a raised portion of the metal member by using the thin sheet type welding material.

FIG. 13 illustrates the repair intended to increase the height of a narrow rising wall 1' that is produced sometimes in the metal mold or the line. The welding material 4 is padded on the end of the rising wall 1' and the round electrode 5 is rolled for the welding. After the welding, the excessive part of the welded portion is worn away, ground and finished to complete the repair similarly to the above discussed embodiments.

Figure 14:
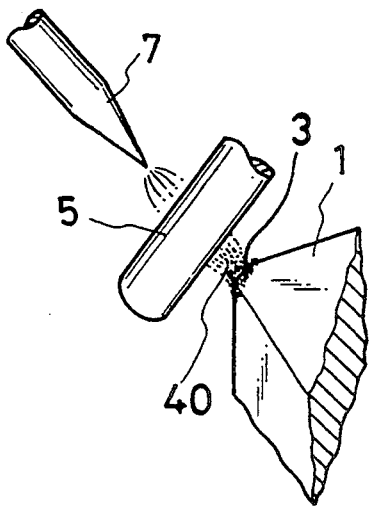
FIG. 14 is a perspective view showing a process of welding an obtuseness of the metal member corner by using the welding powder.
Figure 15A:
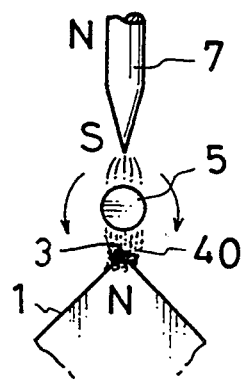
FIGS. 15A through 15D are plane views showing processes of welding the obtuseness of the metal member corner by using the welding powder.
Figure 15B:
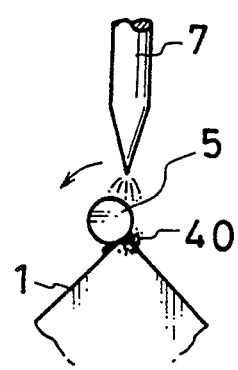
Figure 15C:
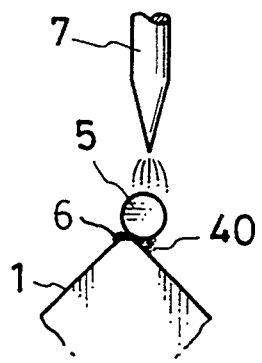
Figure 15D:
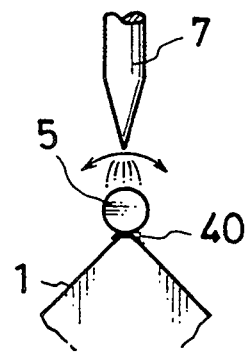

FIG. 14 is a perspective view showing the build-up welding process at the triangle apex of the metal member 1 by using the welding powder 40 and the magnet piece 7. FIGS. 15A through 15D show how to move and use the primary electrode 5 in the build-up welding. The illustrated round primary electrode 5 is appropriate for repairing a corner or a triangle apex. The fine welding powder 40 in the proper volume is provided on the part 3 to be repaired as shown in FIG. 14. When the welding powder 4 and one pole (S or N pole) of the tapered magnet piece 7 approach the corner of the metal member 1 wherein the magnet piece is at right angles with the corner, the magnetic welding powder 40 stands at the corner of the metal member 1 along the magnetic line of force. The primary electrode 5 is positioned between the magnet piece 7 and the metal member 1 at 45 degrees. This electrode rolls in the upward, downward, right and left directions. The welding powder 40 is padded to the part to be repaired along a minute line or at certain spots and is welded repeatedly. The build-up welding is accomplished by arranging the minute line of nuggests or spot type nuggets in a series and overlapping them in multi-layered fashion. If the thickness of the build-up welded part is not sufficient, additional welding powder 40 of an appropriate volume may be provided and the nuggets overlapped for the welding.

The material of the welding powder 40 may depend on the material of the metal member 1. If the metal member 1 is steel, iron and nickel alloy powder has good welding characteristics. If the metal member is steel or stainless steel, welding powder of stainless steel is appropriate. Since stainless steel is not magnetic, it is not proper to use a magnet. Such welding powder is available commercially at reasonable cost. The grain size of the welding powder may be made to a 150-320 mesh by grain processing such material. The smaller grain of the welding powder is better because a smaller current is possible and better welding characteristics appear. Since a sufficient thickness of nuggets is required, 200 mesh of the grain size may be most appropriate. Even if the material of the metal member is conductive, copper and aluminum cannot be used for welding. Beryllium, copper alloy, aluminum alloy, steel and stainless steel may be better as the main material. When the metal member is non-magnetic stainless steel, the magnet cannot be used. The welding powder of hard metal can be welded to steel having a nitride processed surface and to other hard metals. The part of the metal member 1 to be welded should be pre-processed by previously removing metal oil and impurities.

The power supply apparatus shown in FIG. 4A can be used to apply a current to the primary electrode and the secondary electrode for the welding method using such welding powder. When the welding repair is manually done, the welding powder of the proper volume is piled up on the part of the metal member to be repaired and the worker holds the electrode holder and presses the end of the primary electrode to the welding powder 40 strongly. The foot switch of the power supply apparatus is turned on to send a large current pulse of 300-1000 amperes in order to form the spot type nuggets on the metal member. In another case, the primary electrode is moved forward by a pitch corresponding to the diameter of the nugget to arrange the nuggets in a series or to overlap the nuggets in a multi-layered fashion for the spot, line or plane type build-up welding of the necessary thickness at the area to be repaired. When the welding is done by a machine, the primary electrode is mounted to a robot hand or the like and an automatic switch is provided at the power supply apparatus.

Figure 16:
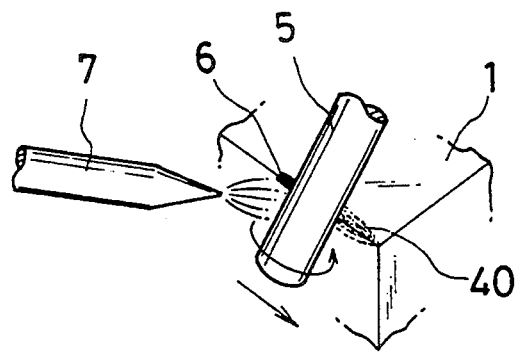
FIG. 16 is a perspective view showing how to weld the rib of the metal member by using the welding powder.
Figure 17A:
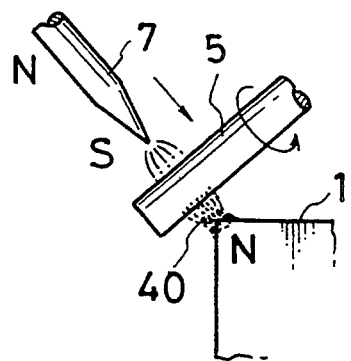
FIGS. 17A through 17D are front views showing processes of welding the rib of the metal member by using the welding powder.
Figure 17B:
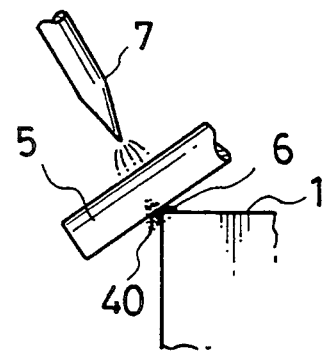
Figure 17C:
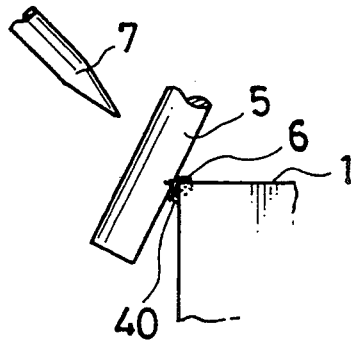
Figure 17D:
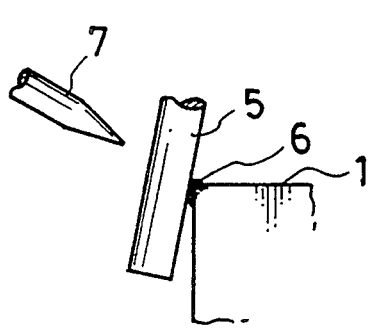

FIG. 16 illustrates an example how to repair the rib line of the metal member 1 with welding by using the welding powder and the magnet. The fine welding powder 40 of the proper volume is piled up on the rib of the metal member 1 to be repaired. The magnet piece approaches the rib so that the welding powder stands up concentrically. The concentrated welding powder is pressed to the rib of the metal member along a minute line or in spots by the primary electrode 5, or the primary electrode is rolled along the rib for the welding. FIGS. 17A through 17D illustrate the movement and the angle of the primary electrode 5 and the position of the magnet piece 7 as viewed from the side. Since the welding powder 40 is concentrated along the magnetic line of force between the magnet piece 7 and the metal member 1, the welding powder stands up along the rib portion and is attracted to the metal member. Thus, the powder will not fall off. Since the welding powder 40 stands up concentrically, the build-up welding can be done effectively along the rib by moving the primary electrode 5 as shown in FIGS. 17B through 17D. After that, the excessive part of the build-up welded portion 6 is worn away, ground and finished to recover the rib line of the metal member 1.

Figure 18:
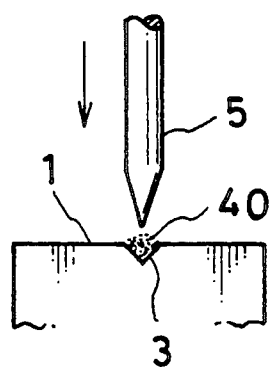
FIG. 18 is a side view showing a method of welding a pin hole of the metal member by using the welding powder.

FIG. 18 illustrates the repair of the small part 3 of the metal member 1, such as a V-notched flaw or a pin hole, with welding by using the welding powder 40. The welding powder of the proper volume is piled up on the small pin hole and the primary electrode 5 is pressed to it strongly for applying the current and welding. If the thickness of the welding in a single weld is not sufficient, the welding powder 4 is further piled up and the welding is repeated to overlap it. The mass of the nuggets is struck with a hammer to thicken the metal texture. Then, the excessive part is worn away, ground and finished similarly to the above discussed embodiment. A mirror surface repair is possible.

Figure 19:
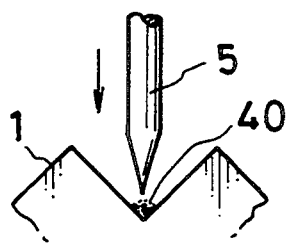
FIG. 19 is a front view showing a method of a welding repair for an inner corner of the metal member by using the welding powder.

FIG. 19 shows the way to repair with welding the inner corner of the metal member 1 by using the welding powder for the radius process. The welding powder 40 of the proper volume is piled up on the inner corner. The sharply tapered primary electrode 5 is used to press the welding powder 40 for the welding.

Figure 20:
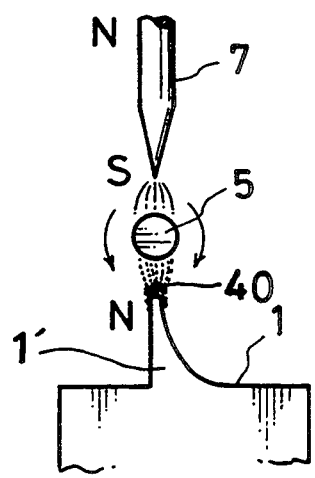
FIG. 20 is a front view showing a method of a welding repair for a rising portion of the metal member by using the welding powder.

FIG. 20 illustrates an example of increasing the height of a narrow rising portion 1' by using the welding powder 40 and the magnet, wherein the rising portion occurs in the metal mold or the like. The welding powder of the proper volume is piled up on the upper surface of the rising portion 1'. The magnet piece 7 makes the welding powder 40 stand up concentrically. The round primary electrode 5 presses the welding powder to the rising portion 1' along a minute line or at spots or the electrode is rolled for the welding. After the welding, the excessive part is worn away, ground and finished similarly to the above discussed embodiment.

Figure 21:
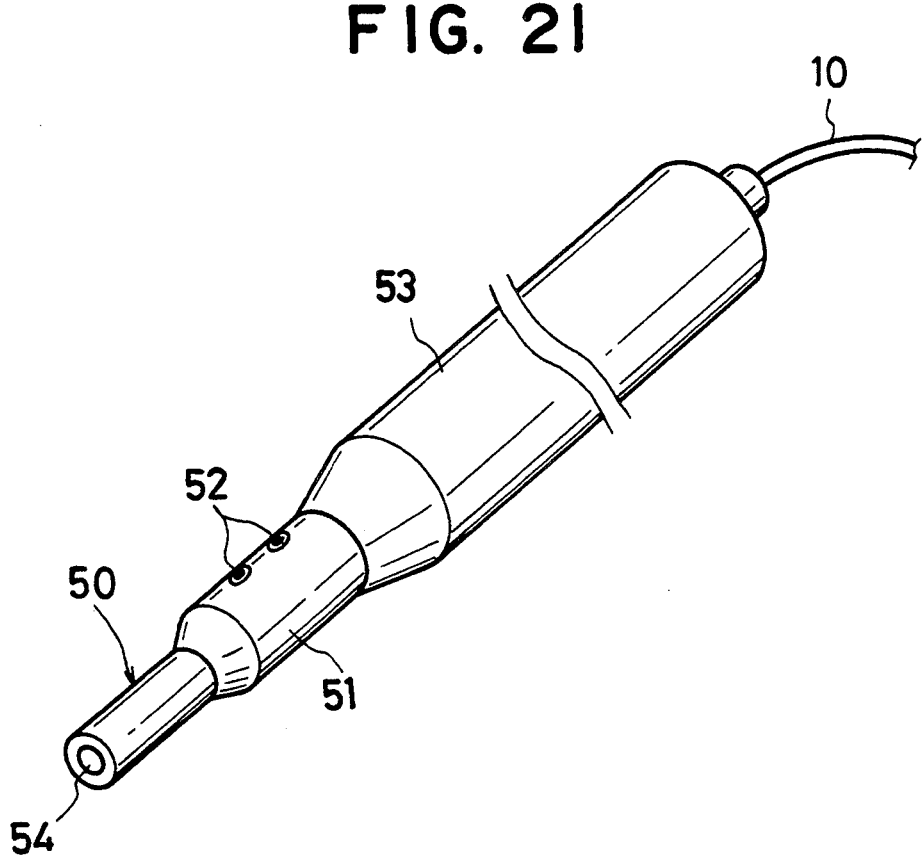
FIG. 21 is a perspective view of a primary electrode including a magnet.
Figure 22:
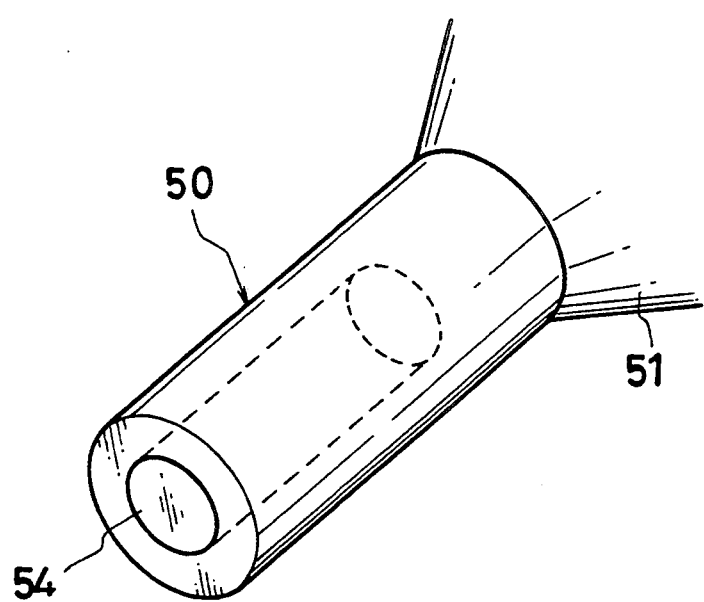
FIG. 22 is a magnified view of the magnet portion.
Figure 23:
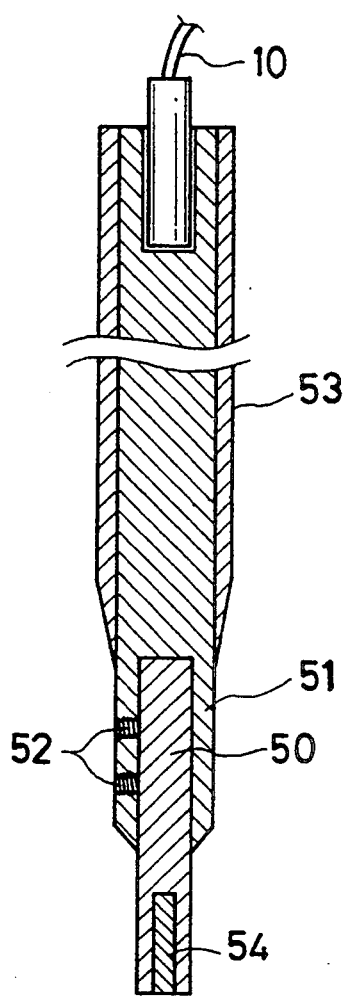
FIG. 23 is a cross-sectional view of the primary electrode.
Figure 25:
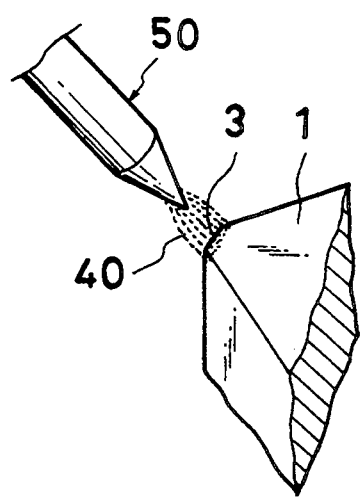
FIGS. 25 and 26 are perspective views showing how to weld the corner and the rib of the metal member by using the primary electrode including the magnet.

FIGS. 21 through 23 illustrate the primary electrode 50 including a magnet appropriate for the welding repair by using the fine welding powder 2. This electrode 50 is a round bar made of silver and tungsten alloy and it size is about 5 mm in diameter and about 30 mm in length. The electrode is inserted into an end of a conductor 51 and is fixed by set screws 52. The outer surface of the conductor 51 is covered by an electrode holder 53 made of an insulating material, such as hard rubber. The conductor 51 is connected to the power supply apparatus via a code 10. A magnet 54 is buried in the end of the round bar type primary electrode 50 and this end portion is used to weld the welding powder to the metal member. The size of the magnet 54 is determined based on attracting the magnetic welding powder of the necessary volume. For example, the magnet size should be 1 mm in diameter and 5 mm in length if the diameter of the primary electrode is 2 mm. The magnet size will likely be 2 mm in diameter and 5 mm in length if the diameter of the primary electrode is 5 mm and this size may be 2 mm in diameter and 10 mm in length if the diameter of the primary electrode is 4 mm. However, the size and shape of the magnet are not limited to the above described examples; it may be 4-mm cube. The setting position and condition of the magnet 54 are not limited to the foregoing examples. When using the primary electrode 50 in which the magnet is mounted, the welding powder of the proper volume is attracted to the outer surface of the electrode if the primary electrode approaches the welding powder received in a container. When the primary electrode approaches the welding powder 40 piled up on the portion 3 of the metal member 1 to be repaired with the welding as shown in FIG. 25, the powder stands up concentrically by the magnetic effect and is attached to the metal member and does not scatter. Thus, the welding operation is efficient. It is not necessary to operate with another magnet.

Figure 24A:
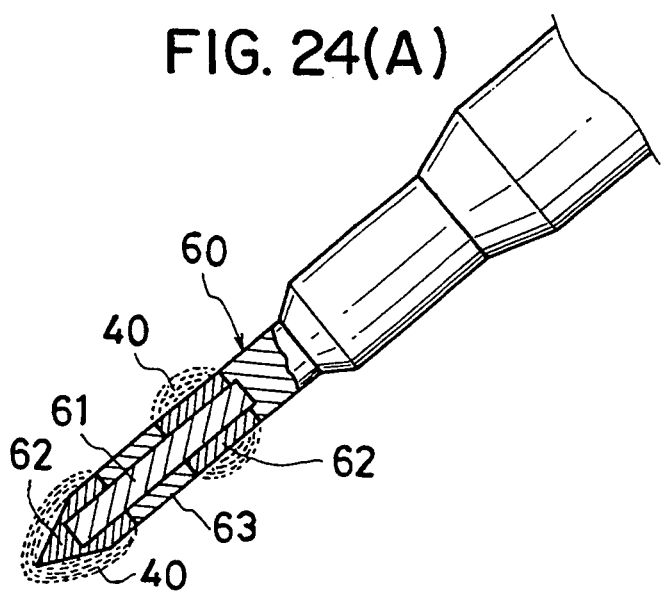
FIGS. 24A and 24B are front views of another embodiment of the primary electrode, a part of which is cut-away.
Figure 24B:
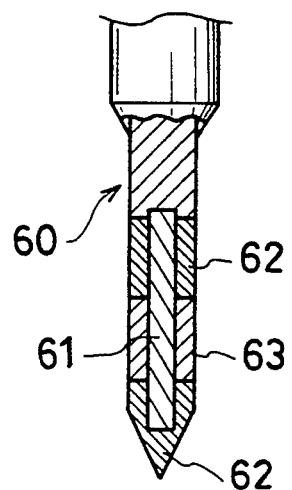
Figure 26:
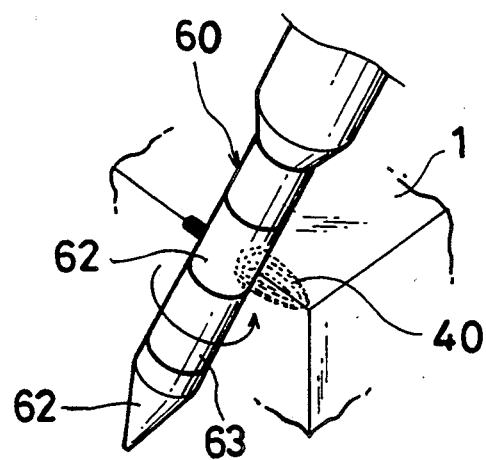

FIGS. 24A and 24B show a primary electrode 60 that is more appropriate for repairing the rib of the metal member 1 with the welding. The size of the primary electrode 60 is about 5 mm in diameter and about 70 mm in length, and the size of the magnet 61 is about 3 mm in diameter and about 30 mm in length. This magnet is mounted in the primary electrode 60. The portion of the primary electrode 60 attracting the welding powder for the welding is made of good magnetic material 62 and the other portion is made of a lining processed non-magnetic material 63, such as copper, aluminum or stainless steel. In repairing the rib of the metal member with the primary electrode 60 as shown in FIG. 26, the necessary welding powder 40 is attracted to only the portion of the good magnetic material 62 at the outer surface of the magnet mounted in the primary electrode 60. The welding powder is not attached to other areas. Thus, the welding job can be done with certainty and speed and work efficiency can be improved.

Although the magnet 54 or 61 is generally the permanent magnet in each the discussed embodiment, an electromagnet can be used to obtain similar advantages. In particular, when the electromagnet is used, the volume of the welding powder attracted to the primary electrode and the attracting conditions can be controlled as desired electrically by adjusting the power of the magnet. Moreover, by turning off the power, the welding powder falls off and can be collected easily.

What is claimed is:

1. A method of repairing a metal member by welding, comprising the steps of:
    connecting a secondary electrode to the metal member to be repaired;
    providing a thin sheet type welding material of about 0.1–0.2 mm thickness on a part of the metal member to be repaired or piling up a fine welding powder on the part of the metal member to be repaired, the volume of the fine welding powder being sufficient to repair the part of the metal member to be repaired;
    pressing said welding material of said welding powder to said metal member along a determined, minute line or at specific determined points by a primary electrode for an electrical conduction;
    applying a large pulse current of about 300–1500 amperes through the conduction portion during a short period of about 1/1000–4/1000 seconds in order to form nuggets along said determined minute line or at said determined points on said metal member;
    executing a point or line type build-up welding of a sufficient thickness in a necessary area of the part to be repaired by repeating the welding operation of pressing said primary electrode and of supplying the current intermittently to form the continuous line of nuggets or to overlap the nuggets; and
    wearing away and grinding the built-up welded part to obtain a desired surface or shape.

2. A method of welding a metal member, comprising the steps of:
    connecting a secondary electrode to a metal member to be welded;

providing a thin sheet type welding material of about 0.1–0.2 mm thickness on the welding position of the metal member or piling up a fine welding powder on the part of the metal member to be repaired, the volume of said fine welding powder being sufficient to repair the part of the metal member to be repaired;

pressing said welding material or said welding powder to said metal member along a determined, minute line or at specific determined points by a primary electrode for an electrical conduction; and applying a large pulse current of about 300–1500 amperes through the conduction portion during a short period of about 1/1000–4/1000 seconds in order to form nuggets along said determined, minute line or at said determined points on said metal number.

3. A welding method according to claim 2, further comprising the steps of:

forming a minute line of nuggets or nuggets at specific points on the metal member to be welded;

pressing said primary electrode and applying the pulse current to said primary electrode intermittently;

moving said primary electrode step by step in the direction of the welding or supplying the necessary welding material or the necessary welding powder; and arranging a number of said nuggets continuously or overlapping said nuggets for a spot, line or plane type build-up welding of a sufficient thickness in the area to be welded.

4. A welding apparatus, comprising:

a secondary electrode connected electrically to a metal member to be welded;

a thin sheet type welding material of about 0.1–0.2 mm thickness provided on the welding position of the metal member or a fine welding powder piled on the welding position of the metal member;

a primary electrode having a shape and strength for pressing said welding material or said welding powder to said meal member along a determined, minute line or at specific points to conduct electrically to said metal member; and a power supply apparatus for applying a large pulse current of about 300–1500 amperes between said primary and secondary electrodes during a short period of about 1/1000–4/1000 seconds.

5. A primary electrode used to press the fine welding powder to the metal member in claims 1, 2, 3 and 4, wherein a permanent magnet or an electromagnet is mounted at a portion of said primary electrode that is used for the welding with said welding powder.

6. A primary electrode used in claim 5, wherein a non-magnetic material forms portions of said primary electrode other than at the portion to be in which welding with said welding powder is performed.

7. A method of welding a metal member, comprising the steps of:

connecting a secondary electrode to a metal member to be welded;

piling up a fine welding powder on a welding position of said metal member;

making one pole of a tapered magnet approach said welding powder on said metal member in order to make said welding powder stand-up along a focused magnetic line of force by said magnet;

pressing said welding powder to said metal member along said magnetic line or at specific points along said magnetic line by a primary electrode for an electrical conduction with said metal member; and applying a large pulse current of about 300–1500 amperes through the conduction portion during a short period of about 1/1000–4/1000 seconds in order to form nuggets along said magnetic line or at said points on said metal member.

8. A welding method according to claim 7, further comprising the steps of:

forming minute line of nuggets or spot type nuggets on the metal member to be welded;

pressing said primary electrode and applying the pulse current to said primary electrode intermittently;

moving said primary electrode and said magnet step by step in the direction of the welding or supplying the necessary welding powder; and arranging numerous said nuggets continuously or overlapping said nuggets for the spot, line or plane type build-up welding of a sufficient thickness in the area to be welded.

* * * * *